United States Patent
Herrmann et al.

(10) Patent No.: US 7,369,944 B2
(45) Date of Patent: May 6, 2008

(54) METHOD OF PROCESSING SEISMIC DATA FOR AVO OR AVOA CHARACTERIZATION

(75) Inventors: Philippe Herrmann, Villepreux (FR); Halim Dariu, Paris (FR)

(73) Assignee: Compagnie Generale de Geophysique, Massy (FR)

( * ) Notice: Subject to any disclaimer, the term of this patent is extended or adjusted under 35 U.S.C. 154(b) by 62 days.

(21) Appl. No.: 11/407,745

(22) Filed: Apr. 19, 2006

(65) Prior Publication Data
US 2006/0253257 A1 Nov. 9, 2006

(51) Int. Cl.
*G01V 1/28* (2006.01)

(52) U.S. Cl. .................................................. 702/17
(58) Field of Classification Search .............. 702/14, 702/17, 18
See application file for complete search history.

(56) References Cited

U.S. PATENT DOCUMENTS

| | | | |
|---|---|---|---|
| 4,633,400 | A | 12/1986 | Chittineni |
| 4,817,060 | A | 3/1989 | Smith |
| 5,982,706 | A | 11/1999 | Byun |
| 6,061,301 | A | 5/2000 | Corrigan |
| 6,263,284 | B1 * | 7/2001 | Crider et al. .................. 702/14 |
| 2003/0176975 | A1 * | 9/2003 | Matteucci et al. ............. 702/17 |
| 2004/0015296 | A1 | 1/2004 | Causse et al. |
| 2004/0109387 | A1 | 6/2004 | Jenner et al. |

OTHER PUBLICATIONS

Ruger, Andreas, "Variation of P-Wave Reflectivity with Offset and Azimuth in Anisotropic Media", Geophysics, vol. 63, No. 3, May-Jun. 1998, pp. 935-947, XP-002369054.
Hall et al., "Fracture Characterization at Valhall: Application of P-Wave Amplitude Variation with . . . ", Geophysics, vol. 68, No. 4, Jul.-Aug. 2003, pp. 1150-1160, XP00239055.

* cited by examiner

*Primary Examiner*—Donald E McElheny, Jr.
(74) *Attorney, Agent, or Firm*—David M. Ostfeld

(57) ABSTRACT

The invention relates to a method of processing seismic data comprising a gather of seismic traces organised according to one or several acquisition parameters, each trace comprising a seismic signal defined by an amplitude as a function of time or depth, the method comprising the steps of:

Figure 1:
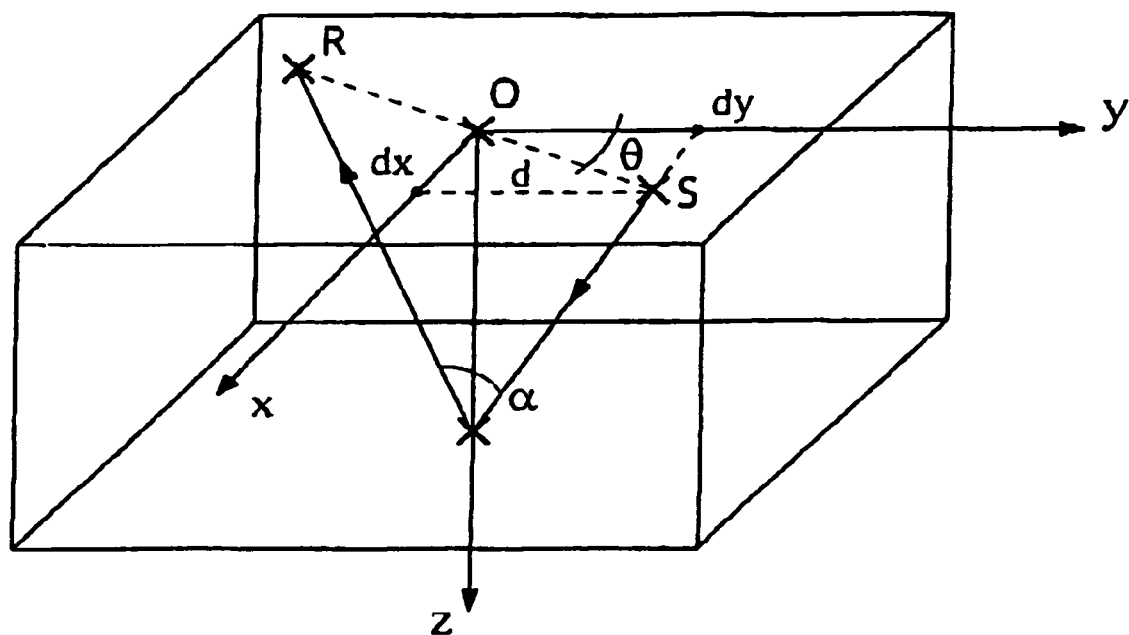

a) defining a base of elementary functions of the acquisition parameter(s), b) orthogonalising said elementary functions so as to define a base of orthogonal elementary functions c) for a given time or at a given depth, determining combination coefficients defining a combination of the orthogonal elementary functions, said combination being an estimator of a variation in the amplitude of the seismic signal as a function of the acquisition parameter(s).

8 Claims, 4 Drawing Sheets

METHOD OF PROCESSING SEISMIC DATA FOR AVO OR AVOA CHARACTERIZATION

CROSS-REFERENCE TO RELATED APPLICATION

This application claims priority to French Application No. 0503884 filed Apr. 19, 2005 entitled "Method for Processing Seismic Data for AVO or AVOA Characterization".

The invention relates to the field of processing data recorded for seismic imaging purposes.

The purpose of seismic imaging is to generate high-resolution images of the subsoil from from acoustic reflection measurements.

Conventionally, in seismic exploration, a plurality of seismic sources and receivers is distributed on the ground surface at a distance from each other. The seismic sources are activated to emit seismic waves that travel through the sub-soil. These seismic waves are deviated as they propagate. They are refracted, reflected and diffracted at geological interfaces of the sub-soil. Certain waves that have travelled through the subsoil are detected by seismic receivers and are recorded over time in the form of signals (called traces). Recorded signals then have to be processed by a migration operation to obtain an image of underground geological structures. The migration operation consists of causing reflections recorded along the corresponding interfaces to converge.

During the processing, the stacking step consists of adding acoustic reflections coming from a same point in the subsoil. This step increases the signal to noise ratio and the amplitude ratio between primary and multiple reflections.

This is done by collecting traces into Common Image Gathers.

For example, assuming the sub-soil is horizontally stratified with no lateral variation of acoustic velocities, then traces which illuminate the same point in the sub-soil for variable source-receiver distances (offsets), are those with a common mid-point between the source and receiver.

This is why traces can be collected into Common Midpoint gathers (CMP).

However, waves reflected in the subsoil are recorded at arrival times that vary as a function of the offset. Therefore, before traces can be added, they have to be corrected to bring them to a common reference, namely the zero offset trace. This correction is made during a so-called Normal Move Out (NMO) correction step.

In general, it is considered that the time at which the same event is recorded varies as a function of the offset along a hyperbolic NMO curve that depends on the average wave propagation velocity in the subsoil. For each time at zero offset, an NMO curve is determined by successive approximations of the velocity and an evaluation of the semblance of traces along the corresponding curve. The determination of NMO curves provides a means of correcting traces so as to align reflections on all traces so that they can be stacked.

However, most of the time, the NMO correction is not sufficiently precise and distortions remain. An additional correction is made during a so-called Residual Move Out (RMO) step.

In general, it is assumed that the residual correction is of the parabolic type.

For example, in document <<Robust estimation of dense 3D stacking velocities from automated picking>>, Franck Adler, Simon Brandwood, 69th Ann. Internat. Mtg., SEG 1999, Expanded Abstracts, the authors suggest an RMO correction defined by the equation:

$$\tau(x,t) = x^2(V^{-2} - V_{ref}^{-2})/2t$$

where $\tau$ is the RMO correction, x is the offset, t is the time at zero offset, $V_{ref}$ is a reference velocity function and V is an updated velocityd.

Furthermore, a study of the Amplitude Variation with Offset (AVO) and of the Amplitude Variation with Offset and Azimuth (AVOA) provides a means of obtaining useful information about the lithological properties of the sub-soil. The consequence of impedance contrasts in the sub-soil is that the amplitude of a wave reflected on an interface varies as a function of the angle of incidence of the wave and also the azimuth.

In general seismic data are separated into data subsets, each subset corresponding to an azimuth sector. It is assumed that in a given azimuth sector, the variation in the amplitude of traces along an RMO/NMO curve is linear and depends only on an acquisition parameter. Thus, in a given azimuth sector, the AVO is defined by two parameters, namely an intersect and a gradient.

This approach is not fully satisfactory for several reasons.

Firstly, to keep the resolution within the characterisation of the AVO, azimuth sectors with a sufficiently small aperture angle need to be defined. However, the reduction in the aperture angle of azimuth sectors reduces the number of traces contained in a particular subset, and consequently results in under-sampling. The increase in the number of azimuth sectors also reduces the processing efficiency of seismic data.

Thus, to obtain subsets of seismic data with regular sampling, and to maintain the processing efficiency of seismic data, azimuth sectors with a sufficiently large aperture angle need to be defined. However, the increase in the aperture of azimuth sectors causes a degradation of the resolution of AVOA characterisation as a function of the azimuth.

Furthermore, the AVOA is characterised independently by each azimuth sector, which means that the correlation between data associated with distinct azimuth sectors cannot be taken into account.

There is no model according to prior art for correlating AVO variations between azimuth sectors.

One purpose of the invention is to derive from recorded seismic data an evaluation of the AVO which is more precise than is possible with prior art techniques.

There is provided according to the invention a method of processing seismic data comprising a gather of seismic traces organised according to one or several acquisition parameters, each trace comprising a seismic signal defined by an amplitude as a function of time or depth, the method comprising the steps of:

a) defining a base of elementary functions of the acquisition parameter(s), b) orthogonalising said elementary functions so as to define a base of orthogonal elementary functions c) for a given time or at a given depth, determining combination coefficients defining a combination of the orthogonal elementary functions, said combination being an estimator of a variation in the amplitude of the seismic signal as a function of the acquisition parameter(s).

The method according to the invention can be used to determine the variation in the amplitude of the seismic signal more precisely than with prior art methods. The method can also be used to characterise a complex AVOA phenomenon on seismic data along the RMO/NMO curves and take account of a plurality of acquisition parameters.

Thus, the method according to the invention can be used to obtain a finer description of the AVOA phenomenon than is possible with prior art methods. In particular, it makes it possible to take account of all seismic data without separating these data into subsets.

Thus, with the method according to the invention, the azimuth resolution of seismic data can be preserved by using all available seismic data.

Furthermore, the method according to the invention is applicable to any type of gather of traces, particularly including multi-dimensional gathers, in other words gathers of seismic traces organised according to several acquisition parameters.

The method according to the invention can be used to obtain a multi-dimensional AVOA characterisation.

The method according to the invention may include one of the following characteristics:
- traces have been corrected previously in an RMO correction step,
- the acquisition parameter(s) is (are) chosen from among the group of parameters consisting of the offset, azimuth angle, scatter angle, source-receiver coordinates,
- step c) is carried out for a plurality of sampling times or depths,
- the elementary functions are polynomial or trigonometric functions,
- the method also comprises a step consisting of normalising elementary functions so as to define a normalised elementary functions base,
- step c) comprises the step of determining a variation in the amplitude of traces as a combination of orthogonal elementary functions,
- seismic data include a plurality of traces gathers, steps a), b) and c) being carried out independently for each traces gather,
- the method includes the steps of determining variations of the coefficients as a function of the acquisition parameter(s) on a plurality of traces gathers and filtering the coefficients.

Figure 2:
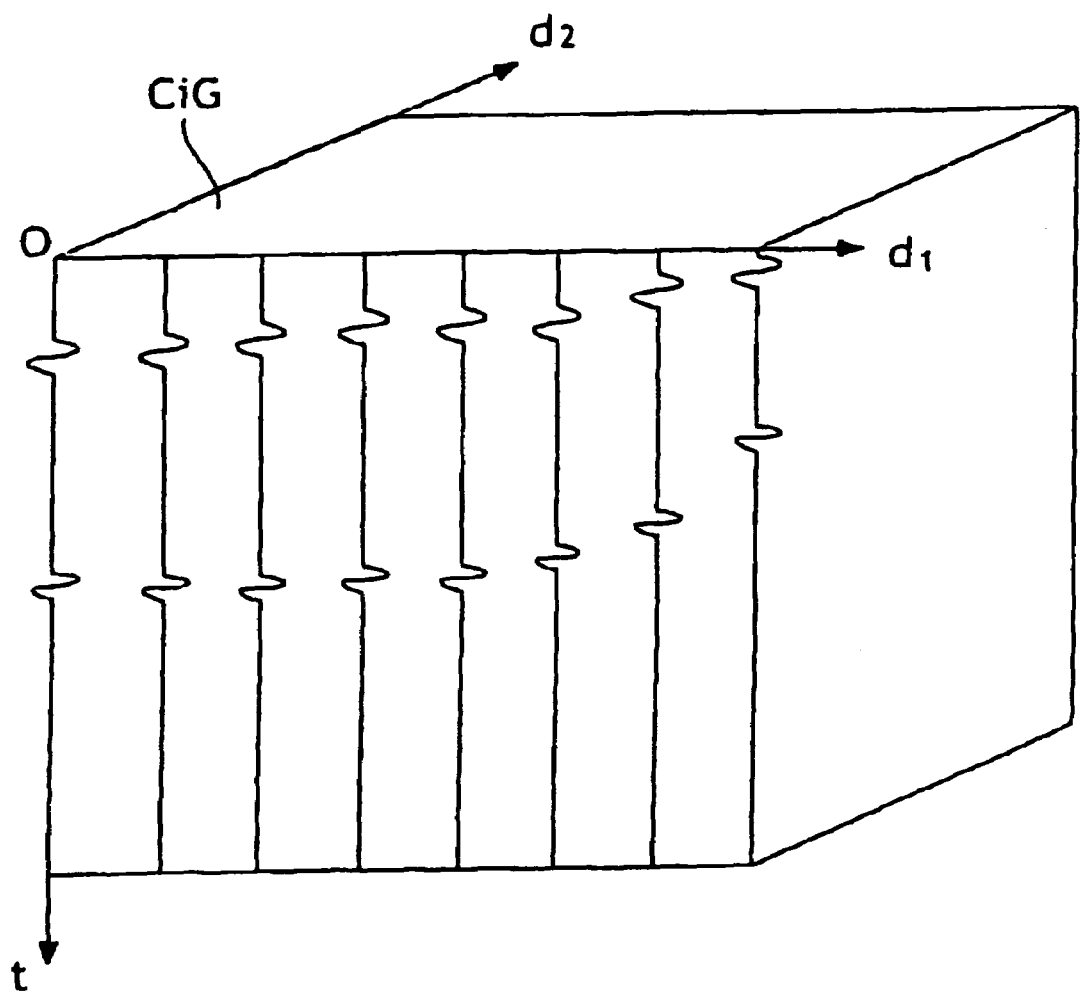
Figure 3:
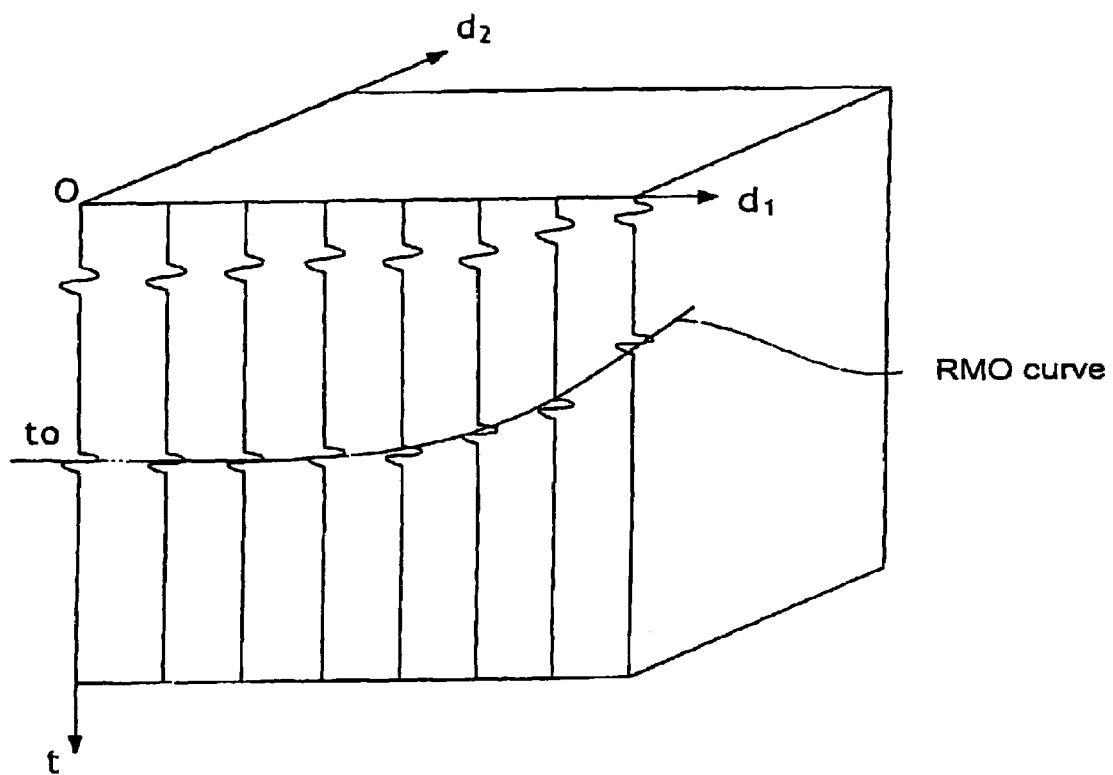
Figure 4:
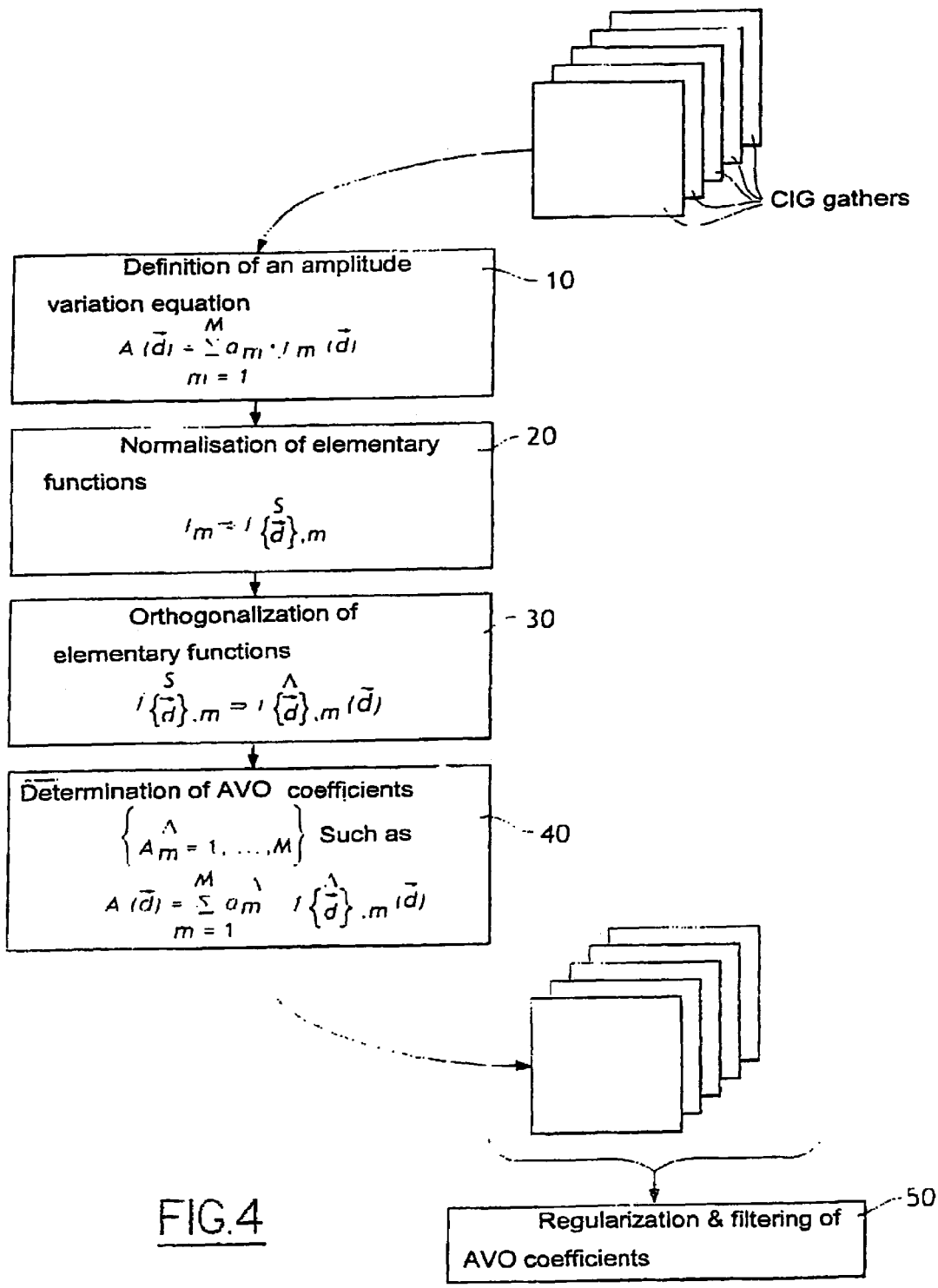

Other characteristics and advantages will be clear from the following description which is purely illustrative and is in no way limitative and should be read with reference to the attached drawings among which:

FIG. 1 diagrammatically shows raypaths of seismic waves travelling between source-receiver pairs with the same common midpoint, FIG. 2 diagrammatically shows a gather of traces (CIG) obtained after an NMO correction, FIG. 3 shows an RMO curve applied to the gather of traces in FIG. 2, FIG. 4 is a diagram showing the sequence of steps in a processing method in accordance with an embodiment of the invention.

FIG. 1, shows a source S-receiver R pair placed on the ground surface. During a seismic acquisition, the source S is activated to generate a seismic wave that travels through the sub-soil. The seismic wave is reflected at an interface and reaches receiver R. Receiver R records the amplitude of the wave that it receives over time. The record (or trace) obtained by the receiver R is defined by a variation of the amplitude as a function of time. The trace contains a signal corresponding to the reflection of the wave on the interface.

Note:
O is the midpoint between the source S and the receiver R, d is the distance between the source S and the receiver R, namely the offset, $(sr_x, sr_y)$ are the coordinates of the R-S segment at the ground surface, in an (O, x, y, z) coordinate system, $\theta$ is the azimuth angle of the R-S segment in the (O, x, y, z) coordinate system, $\alpha$ is the incidence angle (angle between the incident wave and the reflected wave at the reflection point).

It will be understood that a plurality of receivers are placed on the ground surface during a seismic acquisition.

FIG. 2 shows a CIG gather of seismic traces obtained after filtering and NMO correction. The gather contains a number N of traces. The traces are organised according to one or several acquisition parameters $d_1, d_2, \ldots d_n$.

More precisely, traces are grouped into a gather of common mid-point (CMP) traces before migration or into a common image gather (CIG) after migration.

The acquisition parameters considered are offset d and possibly azimuth angle $\theta$.

FIG. 3 shows the CIG gather on which a picking of an RMO curve has been carried out at time $t_0$.

The method according to the invention enables a variation in the amplitude of traces along RMO/NMO curves to be determined in each gather of a plurality of CIG gathers and for each sampling depth z.

According to an embodiment of the invention, the processing method includes the steps shown in FIG. 4.

The following steps are carried out for each CIG gather.

According to a first step 10, an equation of variation in the amplitude of traces is defined as a linear combination of elementary functions.

$$A(\vec{d}) = \sum_{m=1}^{M} a_m \cdot f_m(\vec{d}) \quad [1]$$

where
A is the amplitude of the recorded seismic signal, $(a_1, a_2, \ldots a_M)$ are the coefficients of the linear combination, $(f_1, f_2, \ldots f_M)$ are the elementary functions, $\vec{d} = (d_1, d_2 \ldots d_n)$ are the acquisition parameters considered, M is the dimension of the elementary functions base (M ≥ 2).

The dimension M of the decomposition base depends on the complexity of the AVOA behaviour. The increase in the dimension M increases the precision of the description of the AVOA.

The expression of elementary functions $f_m$ depends on the organisation of the CIG gather.

According to a first possibility, the traces are grouped into a common midpoint (CMP) gather as a function of the offset d. The elementary functions may be defined as follows:

$$f_m(\vec{d}) = d^m \text{ with } m=0, \ldots, M \quad [2]$$

or $$f_m(\vec{d}) = \cos(2\pi d/\lambda_m) \text{ with } m=0, \ldots, M \quad [3]$$

where $\vec{d} = d$.

According to a second possibility, the traces are grouped into a common midpoint (CMP) gather as a function of the offset and the azimuth.

The elementary functions can then be defined as follows:

$$f_m^p(\vec{d}) = d_x^{m-p} d_y^p \text{ with } m=1, \ldots, M \text{ and } p=0, \ldots, m \quad [4]$$

or $$f_m^p(\vec{d}) = \cos(2\pi d_x/\lambda_{xm})\cos(2\pi d_y/\lambda_{yp}) \text{ with } m=1, \ldots, M \text{ and } p=0, \ldots, m \quad [5]$$

where $\vec{d}=(d_x, d_y)=(sr_x, sr_y)$.

According to a second step 20, the elementary functions $f_m$ are normalised according to the sampling $\{\vec{d}_{n=1 \ldots m}\}$ in the CIG gather. Thus, the normalised elementary functions are defined as follows:

$$f_{\{\vec{d}\},m}^S(\vec{d}_n) = f_m(\vec{d}_n) \Big/ \sqrt{\sum_{k=1}^{N} f_m^2(\vec{d}_k)} \quad [6]$$

where $$f_{\{\vec{d}\},m}^S$$

is the normalised elementary function $f_m$,
k is a trace of the CIG gather,
N is the number of traces in the CIG gather.
This step may be expressed in matrix form as follows:

$$F_{\{\vec{d}\}}^S = F \cdot S_{\{\vec{d}\}} \quad [7]$$

where $$F_{\{\vec{d}\}}^S$$

is a matrix with dimensions N×M defined as $$F_{\{\vec{d}\}}^S = \left( \vec{f}_{\{\vec{d}\}1}^S, \ldots, \vec{f}_{\{\vec{d}\}M}^S \right). \quad [8]$$

F is a matrix with dimensions N×M defined by $F=(\vec{f}_1, \ldots, \vec{f}_M)$ where $\vec{f}_{m=1, \ldots, M} = (f_m(\vec{d}_1), \ldots, f_m(\vec{d}_N))^T,$ [9]

$S_{\{\vec{d}\}}$ is a diagonal normalisation matrix with dimensions M×M defined by $s_{\{\vec{d}\}i, j\ (\neq i)}=0$ and $$s_{\{\vec{d}\}m,m} = 1 \Big/ \sqrt{\sum_{k=1}^{N} f_m^2(\vec{d}_k)}. \quad [10]$$

The purpose of the normalisation step 20 is to define the principal search directions for the AVO variation, independent of the sampling distribution of acquisition parameters $d_1, d_2, \ldots d_n$.

According to a third step 30, the elementary functions are orthogonalised. Thus, orthogonal elementary functions are defined $$\{f_{\{\vec{d}\}m=1, \ldots, M}^\Lambda (\vec{d})\}.$$

This is done by making a breakdown of the matrix $$\left(F_{\{\vec{d}\}}^S\right)^T \cdot F_{\{\vec{d}\}}^S$$

into singular values (SVD) such that:

$$\left(F_{\{\vec{d}\}}^S\right)^T \cdot F_{\{\vec{d}\}}^S = U_{\{\vec{d}\}} \cdot \Lambda_{\{\vec{d}\}} \cdot U_{\{\vec{d}\}}^T \quad [11]$$

where
$U_{\{\vec{d}\}}$ is a rotation matrix with dimensions M×M formed from M eigenvectors $\bar{e}_{\{\vec{d}\}m=1, \ldots, M}$ of the matrix $$\left(F_{\{\vec{d}\}}^S\right)^T \cdot F_{\{\vec{d}\}}^S.$$

$$U_{\{\vec{d}\}} = \left(\vec{e}_{\{\vec{d}\}1}, \ldots, \vec{e}_{\{\vec{d}\}M}\right) \quad [12]$$

$$U_{\{\vec{d}\}}^T \cdot U_{\{\vec{d}\}} = I = \begin{pmatrix} 1 & 0 & 0 \\ 0 & \ddots & 0 \\ 0 & 0 & 1 \end{pmatrix} \quad [13]$$

$\Lambda_{\{\vec{d}\}}$ is a diagonal matrix with dimensions M×M containing eigenvalues $\lambda_{\{\vec{d}\}m=1, \ldots, M}$ $$\Lambda_{\{\vec{d}\}} = \begin{pmatrix} \lambda_{\{\vec{d}\}1} & 0 & 0 \\ 0 & \ddots & 0 \\ 0 & 0 & \lambda_{\{\vec{d}\}M} \end{pmatrix} \quad [14]$$

The normalisation step 20 that precedes step 30 limits the variability of eigenvalues related to sampling conditions $\{\vec{d}\}$ in the CIG gather of traces. Regardless of the sampling conditions, we get:

$$\sum_{i=1}^{M} \lambda_{\{\vec{d}\}i} = M, \forall \{\vec{d}\} \quad [15]$$

The normalisation step 20 also reduces the variability of eigenvectors related to sampling conditions $\{\vec{d}\}$ in the CIG gather of traces. For two given sampling conditions $\{\vec{d}_1\}$ and $\{\vec{d}_2\}$, we have:

$$U_{\{\vec{d}_1\}}^T \cdot U_{\{\vec{d}_2\}} \approx I \quad [16]$$

Starting from relations [10] and [6], we have:

$$(F^S_{\{\vec{d}\}} \cdot U_{\{\vec{d}\}})^T \cdot (F^S_{\{\vec{d}\}} \cdot U_{\{\vec{d}\}}) = \Lambda_{\{\vec{d}\}} \quad [17]$$

$$(F_{\{\vec{d}\}} \cdot S_{\{\vec{d}\}} \cdot U_{\{\vec{d}\}})^T \cdot (F_{\{\vec{d}\}} \cdot S_{\{\vec{d}\}} \cdot U_{\{\vec{d}\}}) = \Lambda_{\{\vec{d}\}} \quad [18]$$

A matrix of AVOA variation approximations can be deduced using:

$$F^\Lambda_{\{\vec{d}\}} = F_{\{\vec{d}\}} \cdot S_{\{\vec{d}\}} \cdot U_{\{\vec{d}\}} = (\vec{f}^\Lambda_{\{\vec{d}\}1}, \ldots, \vec{f}^\Lambda_{\{\vec{d}\}M})^T \quad [19]$$

where $$f^\Lambda_{\{\vec{d}\}m}(\vec{d}) = \sum_{k=1}^{M} \vec{e}_{k,m} \cdot f^S_{\{\vec{d}\}k}(\vec{d}) \text{ with } m = 1, \ldots, M. \quad [20]$$

By construction, we have:

$$(\vec{f}^\Lambda_{\{\vec{d}\}i})^T \cdot \vec{f}^\Lambda_{\{\vec{d}\}j} = 0, \text{ for } i \neq j \quad [21]$$

$$(\vec{f}^\Lambda_{\{\vec{d}\}i})^T \cdot \vec{f}^\Lambda_{\{\vec{d}\}i} = \lambda_i \quad [22]$$

As a function of the decomposition base used to define the AVOA behaviour, the following relations are used:

$$\vec{A} = F \cdot \vec{a} = F^S_{\{\vec{d}\}} \cdot \vec{a}^S_{\{\vec{d}\}} = F^\Lambda_{\{\vec{d}\}} \cdot \vec{a}^\Lambda_{\{\vec{d}\}} \quad [23]$$

where $$\vec{A} = (A(\vec{d}_1), \ldots, A(\vec{d}_N)) \quad [24]$$

$$\vec{a} = (a_1, \ldots, a_M)^T \quad [25]$$

$$\vec{a}^S_{\{\vec{d}\}} = (a^S_1, \ldots, a^S_M)^T \quad [26]$$

$$\vec{a}^\Lambda_{\{\vec{d}\}} = (a^\Lambda_1, \ldots, a^\Lambda_M)^T \quad [27]$$

Hence:

$$\vec{a} = (F^T_{\{\vec{d}\}} \cdot F_{\{\vec{d}\}})^{-1} \cdot F^T_{\{\vec{d}\}} \cdot F^\Lambda_{\{\vec{d}\}} \cdot \vec{a}^\Lambda_{\{\vec{d}\}} = S_{\{\vec{d}\}} \cdot U_{\{\vec{d}\}} \cdot \vec{a}^\Lambda_{\{\vec{d}\}} \quad [28]$$

$$\vec{a}^\Lambda_{\{\vec{d}\}} = U^T_{\{\vec{d}\}} \cdot S^{-1}_{\{\vec{d}\}} \cdot \vec{a} \quad [29]$$

It should be noted that the inverted coefficients $$\vec{a}^\Lambda_{\{\vec{d}\}}$$

are statistically uncorrelated.

It should be noted also that the variance $$\sigma(\vec{a}^\Lambda_{\{\vec{d}\}})$$

of the inverted coefficients is proportional to $1/\lambda_m$.

These properties are used in subsequent step 50 during the processing for uncorrelated AVOA parameters.

In a fourth step 40, the variation in the amplitude of traces is decomposed based on orthogonal elementary functions, for each sampling depth z (or reference time). This is done by determining a set of coefficients $$\{a^\Lambda_{m=1,\ldots,M}\}$$

that express the amplitude variation of traces as a linear combination of orthogonal elementary functions $$f^\Lambda_{\{\vec{d}\}m}(\vec{d}).$$

$$A(\vec{d}_n) = \sum_{m=1}^{M} a^\Lambda_{\{\vec{d}\}m} \cdot f^\Lambda_{\{\vec{d}\}m}(\vec{d}_n) \text{ where } n = 1, \ldots, N \quad [30]$$

The coefficients $$\{a^\Lambda_{\{\vec{d}\}m=1,\ldots,M}\}$$

are calculated using a conventional resolution method to minimise an objective function $$O_p(\vec{a}^\Lambda_{\{\vec{d}\}})$$

defined by:

$$O_p(\vec{a}^\Lambda_{\{\vec{d}\}}) = \sum_{n=1}^{N} \left( \left( A(\vec{d}_n) - \sum_{m=1}^{M} a^\Lambda_{\{\vec{d}\}m} \cdot f^\Lambda_{\{\vec{d}\}m}(\vec{d}_n) \right)^2 \right)^{p/2} \quad [31]$$

The amplitude $A(\vec{d})$ of traces can be predicted from the inverted coefficients $$\vec{a}^\Lambda_{\{\vec{d}\}}$$

for every acquisition parameter $\vec{d}$ according to:

$$A(\vec{d}) = \sum_{m=1}^{M} a^\Lambda_{\{\vec{d}\}m} \cdot f^\Lambda_{\{\vec{d}\}m}(\vec{d}) \quad [32]$$

Steps 10, 20, 30 and 40 are carried out independently for each CIG gather of traces among the plurality of gathers and for each sampled depth z.

According to a fifth step 50, a variation of coefficients $$\{a^\wedge_{m=1,\ldots,M}\}$$

is determined on the set of gathers in the plurality of CIG gathers.

Due to the orthogonality of elementary functions $$f\{\vec{d}\}^\wedge, m,$$

each coefficient $a_m^\wedge$ may be filtered independently of the other coefficients.

The reliability of the AVO variation thus defined or in an equivalent manner the signal to noise ratio associated with each $$a\{\vec{d}\}^\wedge m = 1, \ldots, M$$

coefficient depends on the following conditions:
a) the CIG fold, in other words the number of acquired traces, and the noise associated with each trace,
b) the distribution of acquisition parameters $\vec{d}=(d_1, d_2 \ldots d_n)$ within the CIG gather,
c) the signal to noise ratio of the CIG gather.

In practice, conditions a), b) and c) vary from one gather of traces to another, and from one depth to the other. Consequently, the $$a\{\vec{d}\}^\wedge(x, y, z)$$

coefficients are contaminated by some unwanted high-frequency noise components. In order to spatially stabilise the AVOA decomposition, the coefficients characteristic of the AVOA behaviour must be filtered to improve the spatial continuity of the AVOA decomposition.

Spatial filtering may be applied independently to each AVOA coefficient $$a\{\vec{d}\}^\wedge(x, y, z),$$

given that these coefficients are statistically uncorrelated by construction. Properties of noise elimination filters can also be adapted to the required variability of each inverted AVOA coefficient.

The method can be used to obtain a description of the amplitude variation on a gather of traces in a single pass, in other words without it being necessary to split the gather into offset slices, scatter angle slices or azimuth sectors.

This approach provides a robust and precise AVOA characterisation method.

The AVOA characterisation is optimised regardless of the sampling conditions for CIG gathers.

Data management is thus facilitated. In particular, the single pass approach provides a means of reducing steps to set parameters for data so that they can be processed.

The method is applicable to any type of trace gather, including multi-dimensional gathers, for example such as multi-azimuth gathers. The method enables a multi-dimensional AVOA characterisation (two-dimensional or three-dimensional characterisation).

Since it is carried out in a single pass, the method can process seismic data with a low signal to noise ratio.

The normalisation step 20 assures numeric stability and efficiency of the AVOA decomposition base.

The variance associated with each AVOA coefficient $$a\{\vec{d}\}^\wedge m = 1, \ldots, M$$

is evaluated as $$\sigma\left(a\{\vec{d}\}^\wedge m = 1 \ldots M\right) \approx 1/\sqrt{\lambda_i}.$$

This property may be used for optimal filtering of each individual coefficient.

The result of the AVOA characterisation that uses uncorrelated coefficients can be used for subsequent conventional processing operations such as data binning, data regularization, noise elimination, AVOA quantitative analysis.

The invention claimed is:

1. A method of processing seismic data comprising a gather of seismic traces organized according to one or several acquisition parameters, each trace comprising a seismic signal corresponding to waves that have traveled through a subsoil and have been recorded by a seismic receiver, said signal being defined by an amplitude as a function of time or depth, the method comprising the steps of:
    a) defining a base of elementary functions of the acquisition parameter(s),
    b) orthogonalising said elementary functions so as to define a base of orthogonal elementary functions
    c) for a given time or at a given depth, determining combination coefficients defining a combination of the orthogonal elementary functions, said combination being an estimator of a variation in the amplitude of the seismic signal as a function of the acquisition parameter(s), so as to deduce information about lithological properties of the subsoil based on said estimator.

2. The method according to claim 1, in which said traces have been corrected previously in an RMO correction step.

3. The method according to claim 1, in which the acquisition parameter(s) is (are) chosen from among the group of parameters comprising of the offset, azimuth angle, incidence angle, source-receiver coordinates.

4. The method according to claim 1, wherein step c) is carried out for a plurality of sampling times or depths.

5. The method according to claim 1, in which the elementary functions are polynomial or trigonometric functions.

6. The method according to claim 1, wherein step b) further comprises the step of normalizing elementary functions so as to define a base of normalized elementary functions prior to orthogonilisation.

7. The method according to claim 1, in which seismic data include a plurality of gathers of traces, wherein steps a), b) and c) are carried out independently for each gather of traces.

8. The method according to claim 7, including the steps of determining variations of the coefficients as a function of the acquisition parameter(s) on a plurality of gathers of traces and filtering the coefficients.

* * * * *